United States Patent
Kulkarni et al.

(10) Patent No.: US 12,452,583 B2
(45) Date of Patent: Oct. 21, 2025

(54) HAZARD DETECTING METHODS AND APPARATUSES

(71) Applicant: Honeywell International Inc., Charlotte, NC (US)

(72) Inventors: Sumit Kulkarni, Charlotte, NC (US); Janmejaya Tripathy, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 33 days.

(21) Appl. No.: 18/455,238

(22) Filed: Aug. 24, 2023

(65) Prior Publication Data

US 2024/0073594 A1 Feb. 29, 2024

(30) Foreign Application Priority Data

Aug. 31, 2022 (IN) .............................. 202211049733

(51) Int. Cl.
*H04R 1/32* (2006.01)
*G08B 17/00* (2006.01)
(Continued)

(52) U.S. Cl.
CPC ............. *H04R 1/326* (2013.01); *H04N 23/61* (2023.01); *H04N 23/671* (2023.01); *G08B 17/00* (2013.01);
(Continued)

(58) Field of Classification Search
CPC .... H04R 1/326; H04R 2410/01; H04R 3/005; H04N 23/61; H04N 23/671; H04N 23/69; H04N 23/693; H04N 7/188; G08B 17/00
See application file for complete search history.

(56) References Cited

U.S. PATENT DOCUMENTS 9,852,620 B1 * 12/2017 Hoeft .................... G08B 25/009
2003/0066638 A1 * 4/2003 Qu .......................... F22B 21/00
257/E23.11

(Continued)

FOREIGN PATENT DOCUMENTS

CN 2704030 Y 6/2005
CN 104616417 A 5/2015
(Continued)

*Primary Examiner* — Carolyn R Edwards
*Assistant Examiner* — Kuassi A Ganmavo
(74) *Attorney, Agent, or Firm* — Alston & Bird LLP (57) ABSTRACT

A detection apparatus is provided. The detection apparatus may include a microphone configured to detect a combination of a first and second soundwave, wherein the first soundwave comprises background noise, a memory configured to store a first pre-determined sound signature corresponding to the background noise and a second pre-determined sound signature corresponding to a hazard soundwave. The detection apparatus may include a controller component configured to identify a presence of the second soundwave in the detected combination by matching a signature of the combination with the first pre-determined sound signature, reduce a level of the first soundwave in the detected combination using a noise reduction, produce an extracted second soundwave based on the noise reduction, determine an extracted sound signature corresponding to the extracted second soundwave, determine a matching level of the extracted sound signature with the second pre-determined sound signature, and determine a presence of a known hazard.

20 Claims, 7 Drawing Sheets

(51) Int. Cl.
  *H04N 7/18*   (2006.01)
  *H04N 23/61*  (2023.01)
  *H04N 23/67*  (2023.01)
  *H04N 23/69*  (2023.01)
  *H04R 3/00*   (2006.01)

(52) U.S. Cl.
  CPC ............. *H04N 7/188* (2013.01); *H04N 23/69* (2023.01); *H04R 3/005* (2013.01); *H04R 2410/01* (2013.01)

(56) References Cited

U.S. PATENT DOCUMENTS

| | | | |
|---|---|---|---|
| 2005/0046584 A1* | 3/2005 | Breed | B60N 2/02246 340/13.31 |
| 2008/0069365 A1* | 3/2008 | Shuttleworth | H04S 7/301 381/57 |
| 2013/0141576 A1* | 6/2013 | Lord | G08G 1/162 348/148 |
| 2016/0091398 A1* | 3/2016 | Pluemer | G01M 7/00 702/183 |
| 2016/0316293 A1* | 10/2016 | Klimanis | G10L 25/54 |
| 2017/0103776 A1* | 4/2017 | Kim | G10L 25/24 |
| 2017/0221503 A1* | 8/2017 | Kuroki | G06V 20/54 |
| 2017/0263266 A1* | 9/2017 | Henrique Barbosa Postal | G06F 16/9535 |
| 2021/0233554 A1* | 7/2021 | Buddhadev | G01S 3/8006 |
| 2022/0136698 A1* | 5/2022 | Jayarathne | F23N 5/022 431/13 |
| 2022/0176316 A1 | 6/2022 | McNicholas | |
| 2022/0177295 A1 | 6/2022 | McNicholas | |

FOREIGN PATENT DOCUMENTS

| | | | |
|---|---|---|---|
| CN | 205210315 U | 5/2016 | |
| CN | 206516023 U | 9/2017 | |
| CN | 110706721 A | 1/2020 | |
| CN | 210954230 U | 7/2020 | |
| CN | 109612573 B | 1/2021 | |
| CN | 110761840 B | 2/2021 | |
| CN | 112295145 A | 2/2021 | |
| EP | 0935098 B1 * | 12/2002 | |
| JP | 2021-135594 A | 9/2021 | |
| WO | 2011/108943 A1 | 9/2011 | |
| WO | WO-2016131361 A1 * | 8/2016 | ............... H04N 7/18 |

* cited by examiner

FIG. 7

HAZARD DETECTING METHODS AND APPARATUSES

CROSS-REFERENCE TO RELATED APPLICATIONS

This application claims priority pursuant to 35 U.S.C. 119(a) to India Application No. 202211049733, filed Aug. 31, 2022, which application is incorporated herein by reference in its entirety.

BACKGROUND

Hazard detecting devices may detect and/or sense the presence of fire or similar hazards in the environment. In general, fire detectors may use heat or smoke generated by fire for the detection purposes. Some fire detectors may detect fire after it is already spread or is at a dangerous level.

Applicant has identified many technical challenges and difficulties associated with detecting and sensing the presence of fire or similar hazards in the environment. Through applied effort, ingenuity, and innovation, Applicant has solved problems related to detecting and sensing the presence of fire or similar hazards in the environment by developing solutions embodied in the present disclosure, which are described in detail below.

BRIEF SUMMARY

Various embodiments described herein relate to methods, apparatuses, and systems for detecting fire using soundwave.

In accordance with various examples of the present disclosure, a detection apparatus is provided. The detection apparatus may include a microphone configured to detect a combination of a first soundwave and a second soundwave, wherein the first soundwave comprises background noise, a memory configured to store a first pre-determined sound signature corresponding to the background noise and a second pre-determined sound signature corresponding to a hazard soundwave. The detection apparatus may include a controller component configured to identify a presence of the second soundwave in the detected combination by matching a signature of the combination with the first pre-determined sound signature, reduce a level of the first soundwave in the detected combination using noise reduction, produce an extracted second soundwave based on the noise reduction, determine an extracted sound signature corresponding to the extracted second soundwave, determine a matching level of the extracted sound signature with the second pre-determined sound signature, and determine a presence of a known hazard based on the matching level determination.

In some examples, the memory of the detection apparatus is configured to store a plurality of second pre-determined sound signatures each corresponding to one of a plurality of known hazard soundwaves caused by any of a fire, flame, spark, combustion, or ignition and wherein the controller component is further configured to determine a type of the known hazard based on a matching level of the extracted sound signature with a second pre-determined sound signatures corresponding to the type of the known hazard.

In some examples, the controller component of the detection apparatus is further configured to determine a pattern of the extracted second soundwave, wherein the pattern may indicate any of the temporal continuity and amplitude of the extracted second soundwave. In some examples, the controller component is configured to determine the fire using a trained machine learning model to distinguish the specific soundwave signature from the background soundwave and match the specific soundwave signature with the pre-determined soundwave signatures corresponding to fire or spark. The controller component may further be configured to generate an alarm indicating the presence of the known hazard when the determined temporal continuity is greater than a continuity threshold. The controller component may further be configured to determine an intensity of the known hazard using the amplitude of the extracted second soundwave, or to determine a material medium of the known hazard using the amplitude of the extracted second soundwave.

In some examples, the controller component of the detection apparatus is further configured to calibrate the detecting apparatus by collecting a background noise calibrating soundwave in a controlled environment where the detecting apparatus is located and when the known hazard is absent, and determine the first sound signature using the background noise calibrating soundwave where the background noise calibrating soundwave is received from any of the microphone, an environment monitoring sensor, or a remote environment monitoring server.

In some examples, the detection apparatus further includes a second microphone configured to detect the combination of the first and second soundwaves. The controller component is further configured to determine a direction or distance of a source of the second soundwave with respect to the detecting apparatus using a first output from the first microphone and a second output from the second microphone, where the first and second outputs comprise phase or frequency of the second soundwave as detected by each of the first and second microphones. The controller component may further be configured to determine a speed of the source of the second sound wave with respect to the detecting apparatus using the first and second outputs.

In some examples, the detection apparatus further includes an imaging-based detection device configured to detect the known hazard based on image processing, a focusing component configured to direct, orient, or concentrate the imaging-based detection device to an area of interest, where the controller component is further configured to: determine the area of interest using the determined direction or distance of the source of the second soundwave; and update the area of interest using the travel speed of the source of the second soundwave.

In some examples, the microphone is located on a Closed-Circuit Television (CCTV) camera, wherein the CCTV camera includes a focusing component configured to direct, orient, or concentrate the CCTV camera to an area of interest, wherein the controller component is further configured to determine the area of interest based on the determined direction or distance of the source of the second sound wave.

In accordance with various examples of the present disclosure, a method is provided. The method includes detecting a combination of a first soundwave and a second soundwave, wherein the first soundwave comprises background noise, determining a first pre-determined sound signature corresponding to the background noise and a second pre-determined sound signature corresponding to a hazard soundwave, identifying a presence of the second soundwave in the detected combination by determining a matching level of a signature of the combination with the first pre-determined sound signature, reducing a level of the first soundwave in the detected combination using noise reduction, producing an extracted second soundwave based on the noise reduction, determining an extracted sound signature corresponding to the extracted second soundwave, determining a matching level of the extracted sound signature with the second pre-determined sound signature, and determining a presence of a known hazard based on the matching level determination.

In some examples, the method may include determining a plurality of second pre-determined sound signatures each corresponding to one of a plurality of known hazard soundwaves caused by any of a fire, flame, spark, combustion, or ignition, and determining a type of the known hazard based on a matching level of the extracted sound signature with a second pre-determined sound signatures corresponding to the type of the known hazard.

In some examples, the method may further include determining a pattern of the extracted second soundwave, wherein the pattern may indicate any of the temporal continuity and amplitude of the extracted second soundwave.

In some examples, the method may further include generating an alarm indicating the presence of the known hazard when the determined temporal continuity is greater than a continuity threshold.

In some examples, the method may further include comprising determining a direction and a distance of a source of the second soundwave with respect to the detecting apparatus. The method may further include determining a speed of the source of the second sound wave with respect to the detecting apparatus.

In some examples, the method may further include determining a location of the source of the second soundwave using the direction and the distance of the source of the second soundwave with respect to the detecting apparatus, communicating the location of the second soundwave to an imaging-based detection apparatus, imaging the source of the second soundwave using the imaging-based detection apparatus, and updating the location of the source of the second soundwave using the speed of the source of the second sound wave.

In some examples, the method may further include determining a location of the source of the second soundwave using the direction and the distance of the source of the second soundwave with respect to the detecting apparatus, communicating the location of the second soundwave to a Closed-Circuit Television (CCTV) camera, directing the CCTV camera to take an image or record a video of the source of the second soundwave.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements (for example, but not limited to, an example processing circuitry, communication module, input/output module memory) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

Fire is a major disaster in many examples. It may cause loss of life and may cause harm to the environment or economic harm by destroying forests, plants, properties, or materials. Various apparatuses such as, but not limited to, heat and/or smoke detectors, imaging or thermal imaging devices may detect a presence of and/or measure a level of heat or smoke or flames indicating of a fire when the fire reaches certain levels to be detectable. These fire detector apparatuses may detect fire after it is already spread to a dangerous level and may be out of control or when it is spreading too fast. Further, smoke detectors may have limitations such as air flow direction requirement towards the detector. Imaging detectors may have limitations such as requirement for direct line of sight and lack of obstruction of view by objects or other obstacles.

It is desirable, in some examples, to use methods and systems that detect fire and/or the like, or a source or cause of fire at an early stage. It is further desirable, in some examples, to determine any or all of the location, direction, intensity, and the speed of travel of fire and/or the like, or a source or cause of fire. In some embodiments herein, these example desirable features for detectors capable of detecting fire or sources of fire are achieved using soundwave detection. For example, reactions caused by hazards or potential hazards of fire, flame, spark, combustion, ignition, or the like may release energy causing the nearby molecules, for example in the atmosphere, to acquire higher random kinetic energy. In various embodiments herein, the released energy is detected for example as Brownian noise and/or infrasonic waves. There also may be other sounds and Brownian noise present in normal environmental conditions. According to various embodiments herein, the combination of noise/sounds caused by a hazard and the background noise is detected by one or more microphones or compatible detectors as a detected soundwave. The detected soundwave is fed to a controller component. The controller component may extract any sound/noise caused by a hazard from the background noise. According to various embodiments herein, using Machine Learning (ML) algorithms (such as prediction & deep learning or other ML algorithms) to process the extracted soundwaves, the controller component detects fire, flame, spark, combustion, or ignition, or the like at an early stage.

In various embodiments herein, location, direction, intensity, and the speed of travel of hazard or potential hazard such as fire and/or the like are also detected using soundwaves. The controller component may use the detected soundwaves to determine the location, direction, intensity, and the speed of travel of the hazard or potential hazard. In some examples, the detected data may be transmitted to other imaging or video recording devices, such as Closed-Circuit Television (CCTV) cameras, Infra-Red (IR) cameras, high temperature cameras, surveillance cameras, or any imaging system or cameras capable of monitoring and/or detecting fire or the like, for further evaluation or monitoring of the hazard.

In accordance with various embodiments of the present disclosure, example methods, apparatuses and systems for such detections are provided.

Figure 1:
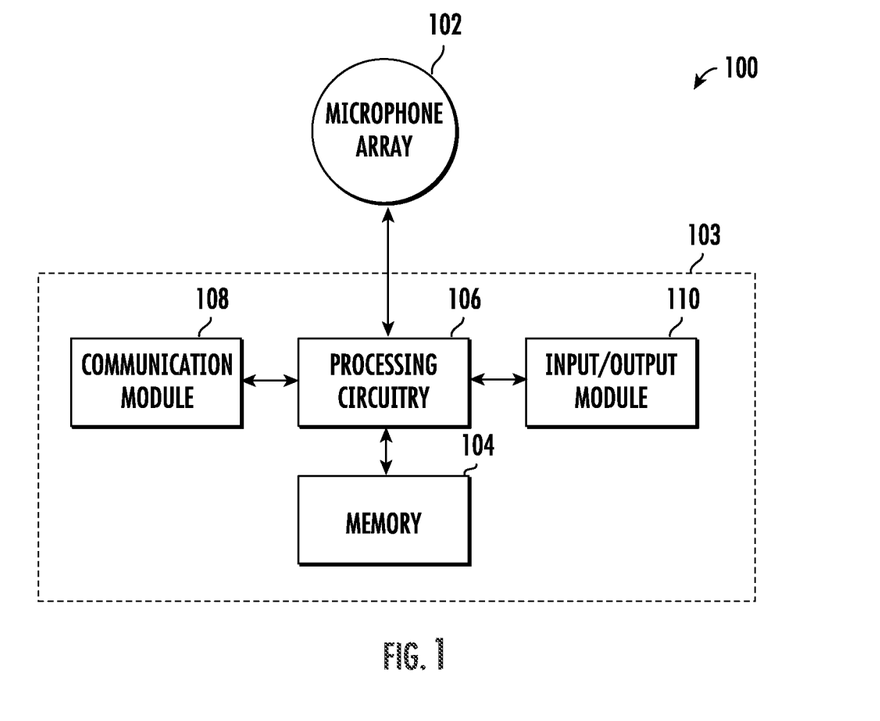
FIG. 1 illustrates an example schematic diagram depicting a hazard detecting system in accordance with various embodiments of the present disclosure.

Referring to FIG. 1, an example schematic diagram depicting a fire, flame, spark, combustion, or ignition (generally referred to as hazards) detecting system 100 in accordance with various embodiments of the present disclosure is provided. It is noted that detecting system 100 may be used to detect other sources of fire or fire related energy in accordance with the embodiments disclosed herein.

As illustrated in FIG. 1, the detecting system 100 comprises a microphone array 102 which may include one or more microphones. The microphone array 102 detects soundwaves from the environment in which the detecting system 100 is located.

The soundwaves detected by the microphone array 102 may include the background noise specific to the environment and having specific features/characteristics. The environment may for example include interior or exterior locations such as forests, fields, farms, plantations, barns, warehouses, server rooms, storage houses, factories, schools, commercial buildings, residential buildings, apartments, etc. For example, if the detecting system 100 is located in a forest, the microphone array 102 detects soundwaves with specific and potentially weather dependent features/characteristics caused by wind, rain, etc. If the detecting system 100 is located in a warehouse, the microphone array 102 detects varying soundwaves with specific features/characteristics caused by equipment, ventilation, air conditioning, etc.

According to various embodiments herein, the detecting system 100 includes a controller component 103. The controller component 103 may include a memory 104. The memory 104 may store a library of background sound signatures corresponding to the background noise specific to the various environments where the detecting system 100 may be located.

In various embodiments herein, a signature of a soundwave or noise may be a set, collection, or any other representation of various identifying properties of the soundwave or noise. For example, the signature may include any of a vector, matrix, table, chart, graph, hologram, and/or set including information or data with respect to a time or frequency distribution of various aspects such as amplitude, phase, energy, power, intensity of the soundwave or noise. In an example, the signature may include information or data indicating various identifying properties of the signals produced by a microphone, or any other sound detection devices, when detecting the noise or soundwave, such as time or frequency distribution of the signals generated as a result of detection.

The background sound signatures may be based on identified features/characteristics of the background soundwaves specific to the environment. The features/characteristics of the background soundwaves may be detected by the microphone array 102, by any other sensor as part of the detection system 100, or received from a remote sensor or server that the detecting system 100 can communicate with.

In addition to the background noise, the microphone array 102 may detect an anomaly soundwave. The anomaly soundwave may be different and/or distinguishable from the background noise. The anomaly soundwave may be caused by a hazard or potential hazard such as a fire, flame, spark, combustion, or ignition. The anomaly soundwave, in some examples, may be any combination of an infrasonic wave and a Brownian noise. The controller component 103 may detect and/or extract the anomaly soundwave from the background noise using machine learning models/algorithms and/or a noise rejection or noise reduction.

In an exemplary embodiment, the noise rejection or noise reduction may include an algorithm for implementing noise rejection/reduction steps. In an example, the noise rejection/reduction algorithm may include a software-defined bandpass, low pass, high pass, or a notch filter. In an example, the noise rejection/reduction algorithm may include subtracting the corresponding sound signature to the environment of the detecting system 100 from the detected soundwave. In an exemplary embodiment, the noise rejection or noise reduction may be implemented using a physical low pass, high pass, or notch filter. In an example, the type and properties of the software-defined or physical filter, such as center frequency, bandwidth, order, etc. may be based on the frequency distribution or other characteristics of the background noise specific to the environment where the detection system 100 is located.

In some embodiments, the controller component 103 may utilize machine learning model/algorithm, such as prediction or deep learning, trained with the library of background noise sound signatures. By detecting a soundwave different from the sound signatures in the library of background noise sound signatures specific to the environment of the detection system 100, the machine learning model/algorithm may detect that an anomaly soundwave is present. The machine learning model/algorithm may also extract the anomaly sound by distinguishing it from the soundwave generated by the background noise. The machine learning model/algorithm may incorporate, utilize, or function in combination with other noise rejection/reduction algorithms for detecting and/or extracting the anomaly soundwave. In various embodiments herein, examples of machine learning model/algorithm used for extracting the anomaly sound by distinguishing it from the soundwave generated by the background noise may include any of various deep learning architectures such as random forest classifiers, and/or convolutional neural networks, and/or recurrent neural networks to classify, identify, recognize, and/or extract different anomaly soundwaves and/or soundwave combinations.

In case of a fire, flame, spark, combustion, ignition, or the like, the anomaly soundwave may be an indication of such hazards and an appropriate alarm or notification is created according to various embodiments herein. The soundwaves that are caused by fire, flame, spark, combustion, ignition or the like may include sounds specific to each. Such specific sounds are for example crackling, sputtering, snapping, roaring blaze, popping, sizzling, hissing, spark discharge sound and other sounds which are generated from various types of material, and may be dependent on size of fire, flame, spark, combustion, ignition and the various environment conditions. According to the embodiment herein, a library of hazard soundwave signatures corresponding to these specific sounds is generated.

The memory 104 may store the library of hazard soundwave signatures. To determine that the anomaly soundwave correspond to a hazard, and/or to determine the type of the hazard, the controller component 103 may match the extracted anomaly soundwave to one or more of the sound signatures corresponding to fire, flame, spark, combustion, ignition or the like in the library of hazard soundwave signatures.

In some embodiments, the controller component 103 may utilize machine learning model/algorithm, such as prediction or deep learning, trained with the library of hazard soundwave signatures. The machine learning model/algorithm may be configured to determine the matching of the extracted anomaly soundwave with the library of hazard soundwave signatures. The example machine learning model/algorithm may be a data object that describes steps/operations, hyper-parameters, and/or parameters of a machine learning model/algorithm that is configured to analyze data (e.g., the extracted anomaly soundwave). The example machine learning model may be trained based at least in part on a ground truth data associated with the library of hazard soundwave signatures (e.g., ground truth data describing stored data/plots associated with a plurality hazard soundwave signatures). The machine learning model/algorithm then determines the level of matching of the extracted anomaly soundwave with the soundwave signature of a particular hazard in the library of hazard soundwave signatures. If any of the levels of matching is above a pre-determined threshold, the machine learning model/algorithm determines the type of hazard with which the extracted anomaly soundwave matches. In some embodiments, the machine learning model/algorithm may be or comprise a neural network, a convolutional neural network (CNN), a recurrent neural network (RNN), and/or the like.

In response to the match determination, the controller component 103 may create an alarm and/or an output signal indicating the type of the hazard with which the anomaly soundwave matches. For example, if a sound corresponding to a spark is detected as the anomaly sound, the controller component 103 determines that a spark is detected and creates an alarm with an output corresponding to spark.

After determining a hazard or the type of hazard that the anomaly soundwave corresponds to, the controller component 103 may continue to monitor the anomaly soundwave corresponding to the hazard to determine any pattern that may be associated with the anomaly soundwave. For example, the controller component 103 may continue to monitor the amplitude of the anomaly soundwave. By doing so, the controller component 103 may also determine the intensity of the hazard. For example, by determining and monitoring the amplitude pattern of the anomaly soundwave, the controller component 103 determines whether the hazard has stopped, continues unchanged, increased in intensity, or turned into a different hazard.

The controller component 103 may create an output indicating the detection pattern, for example the intensity of the detected hazard or the new type of the detected hazard. If the pattern indicates that the hazard has stopped, the controller component 103 may create an output indicating that a false alarm was detected.

In an exemplary embodiment herein, the controller component 103 may create the alarm and/or an output signal indicating the type of the hazard after a time period in which a pattern for the anomaly soundwave is detected. In doing so, if the pattern indicates that the hazard has stopped or otherwise the anomaly soundwave has not continued, the alarm may not be created, and therefore the probability of creating a false alarm is reduced.

The detecting system 100 may include a processing circuitry 106. The processing circuitry 106 may be implemented as, for example, various devices comprising one or a plurality of microprocessors with accompanying digital signal processors; one or a plurality of microprocessors without accompanying digital signal processors; one or a plurality of coprocessors; one or a plurality of multi-core processors; one or a plurality of computers; one or more central processing units (CPU); and various other processing elements (including integrated circuits, such as ASICs or FPGAs, or a certain combination thereof). In some embodiments, the processing circuitry 106 may comprise one or more processors. In one exemplary embodiment, the processing circuitry 106 is configured to execute instructions stored in the memory 104 or otherwise accessible by the processing circuitry 106. When executed by the processing circuitry 106, these instructions may enable the controller component 103 to execute one or a plurality of the functions as described herein. No matter whether it is configured by hardware, firmware/software methods, or a combination thereof, the processing circuitry 106 may comprise entities capable of executing operations according to the embodiments of the present invention when correspondingly configured. Therefore, for example, when the processing circuitry 106 is implemented as an ASIC, an FPGA, or the like, the processing circuitry 106 may comprise specially configured hardware for implementing one or a plurality of operations described herein. Alternatively, as another example, when the processing circuitry 106 is implemented as an actuator of instructions (such as those that may be stored in the memory 104), the instructions may specifically configure the processing circuitry 106 to execute one or a plurality of algorithms and operations described herein, such as those discussed with reference to FIG. 1.

The memory 104 may comprise, for example, a volatile memory, a non-volatile memory, or a certain combination thereof. Although illustrated as a single memory in FIG. 1, the memory 104 may comprise a plurality of memory components. In various embodiments, the memory 104 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 104 may be configured to store information, data, application programs, instructions, and etc., so that the controller component 103 can execute various functions according to the embodiments of the present disclosure. For example, in at least some embodiments, the memory 104 is configured to cache input data for processing by the processing circuitry 106. Additionally or alternatively, in at least some embodiments, the memory 104 is configured to store program instructions for execution by the processing circuitry 106. The memory 104 may store information in the form of static and/or dynamic information. When the functions are executed, the stored information may be stored and/or used by the controller component 103.

In some embodiments, the controller component 103 may comprise a communication module 108. The communication module 108 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 104) and executed by a controller component 103 (for example, the processing circuitry 106). In some embodiments, the communication module 108 (as with other components discussed herein) may be at least partially implemented as the processing circuitry 106 or otherwise controlled by the processing circuitry 106. In this regard, the communication module 108 may communicate with the processing circuitry 106, for example, through a bus. The communication module 108 may comprise, for example, antennas, transmitters, receivers, transceivers, network interface cards and/or supporting hardware and/or firmware/software, and is used for establishing communication with another apparatus. The communication module 108 may be configured to receive and/or transmit any data that may be stored by the memory 104 by using any protocol that can be used for communication between apparatuses. The communication module 108 may additionally or alternatively communicate with the memory 104, the input/output module 110 and/or any other component of the controller component 103, for example, through a bus.

In some embodiments, the controller component 103 may comprise an input/output module 110. The input/output module 110 may communicate with the processing circuitry 106 to receive instructions input by a user and/or to provide audible, visual, mechanical or other outputs to a user. Therefore, the input/output module 110 may comprise supporting devices, such as a keyboard, a mouse, a display, a touch screen display, and/or other input/output mechanisms. Alternatively, at least some aspects of the input/output module 110 may be implemented on a device used by the user to communicate with the controller component 103. The input/output module 110 may communicate with the memory 104, the communication module 108 and/or any other component, for example, through a bus. One or a plurality of input/output modules and/or other components may be included in the controller component 103.

Figure 2:
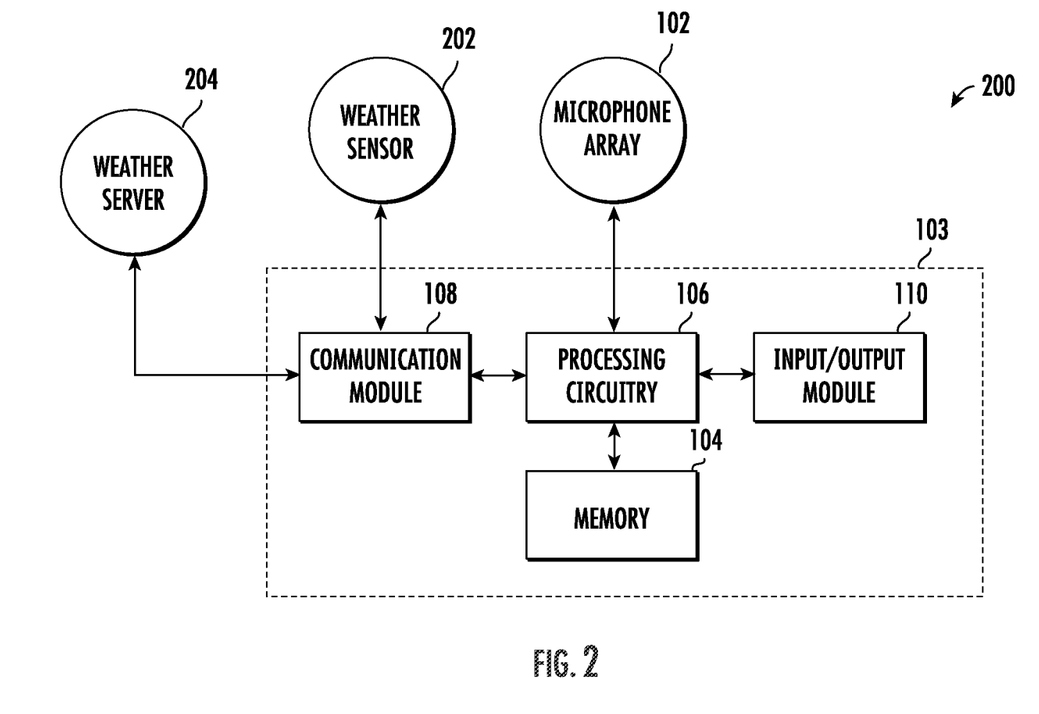
FIG. 2 illustrates an example schematic diagram depicting a hazard detecting system in accordance with various embodiments of the present disclosure.

Referring to FIG. 2, a schematic diagram depicting a hazard detecting system 200 in accordance with various embodiments of the present disclosure is provided. In an exemplary embodiment, the detecting system 200 is placed in outdoor environments where the background noise is weather dependent.

According to various embodiments herein, the communication module 108 may provide communication with a weather sensor 202. The weather sensor 202 monitors the weather situation and continually or periodically communicates the weather data to the controller component 103. Using the updated weather data, the controller component 103 may refine the background noise signature based on the current weather data. For example, if rain, wind, snow, sleet, etc. is detected by the weather sensor 202, a modified version of the library of background noise signatures indicative of the current weather condition may be stored in the memory 104 and/or be used in the noise rejection/reduction algorithm and/or the machine learning model/algorithm for more accurate extraction of an anomaly soundwave.

In an exemplary embodiment, the controller component 103 may receive the weather data from a weather server 204. Similarly, the weather data received from the weather server 204 may be used to refine the library of background noise signatures for a more accurate detection and/or extraction of an anomaly soundwave.

The detection system 200 may use any one or a combination of the weather sensor 202 and the weather server 204 to obtain weather information.

Figure 3:
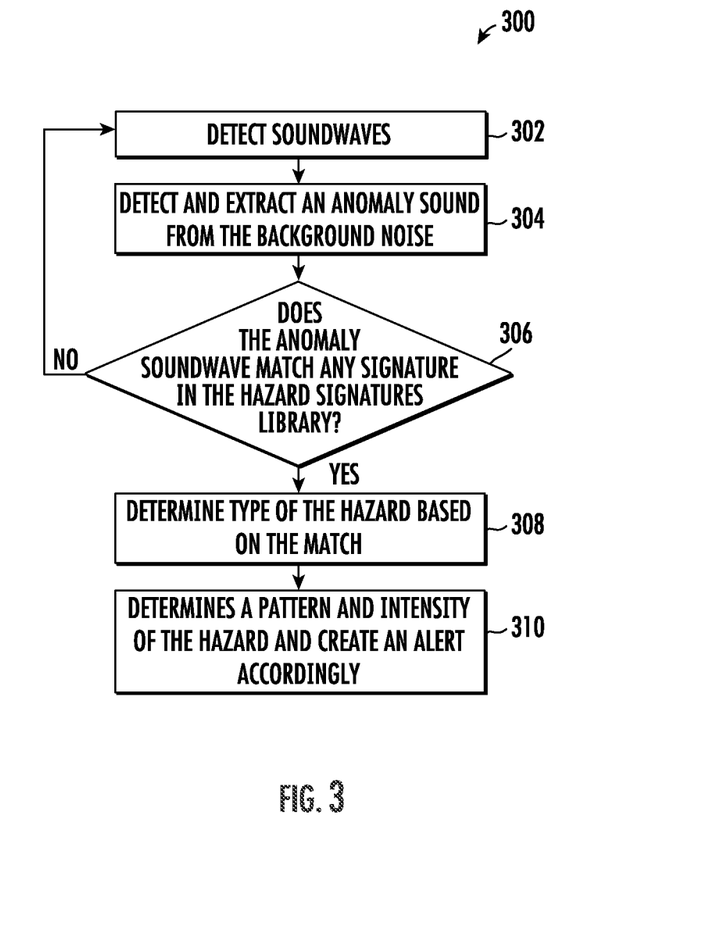
FIG. 3 is a flowchart diagram illustrating example operations in accordance with various embodiments of the present disclosure.

Referring now to FIG. 3, a flowchart diagram illustrating example operations of a method 300 in accordance with various embodiments of the present disclosure is provided.

At step 302 the method 300 detects soundwaves from the environment where the detecting system 100 (with reference to FIG. 1, or the detecting system 200 with reference to FIG. 2) is located. The detected soundwaves may include background noise specific to the environment.

At step 304, the method 300 detects an anomaly soundwave and extracts the anomaly soundwave from the background noise. The method 300 may use machine learning model/algorithms for detecting an anomaly soundwave. The method 300 may continuously or at various time intervals compare or match the detected soundwave or a signature of the detected soundwave to a library the background soundwaves signatures. The library of the background soundwaves signatures may be unique to the environment in which the detection system 100 (or detection system 200) is placed. The library of the background soundwaves signatures may also be dynamically adapted to a current condition in the environment. For example, referring to FIG. 2, the controller component 103 determines the current weather condition using a weather sensor 202 (which may be integrated to the controller component 103) or using a weather server 204 (which may be remotely located with respect to the controller component 103). In this example, using the weather condition data, the method 300 may adapt or update the library of the background soundwaves signatures. For example, the background noise in a rainy environment may be different than the background noise in a windy environment. Therefore, by dynamically adapting the library of the background soundwaves signatures to the current situation, the accuracy of detection of the anomaly soundwave increases.

If, based on the comparison or matching, method 300 determines that a soundwave other than the background noise is present, an anomaly sound is detected. The method 300 then extracts the anomaly soundwave from the background noise using machine learning model/algorithm and/ or a noise reduction algorithm. Further, by dynamically adapting the background soundwave signature to the current situation, the accuracy of extracting the anomaly soundwave also increases.

At step 306, the method 300 determines whether the extracted anomaly soundwave matches any of the soundwave signatures in the stored library of hazard soundwave signatures. The method 300 may utilize machine learning model/algorithm, such as prediction or deep learning, trained with the library of hazard soundwave signatures.

If there is a match between the extracted anomaly soundwave and any of the soundwave signatures in the stored library of hazard soundwave signatures, the method 300 determines the type of the hazard. The method 300 makes this determination based on the soundwave signature that the detected anomaly soundwave has the closest match with.

At step 310, the method 300 determines a pattern and intensity of the hazard. The method 300 may continue to monitor the anomaly soundwave corresponding to the hazard to determine any pattern that may be associated with the anomaly soundwave. For example, the method 300 may continue to monitor the anomaly soundwave for a time period to determine a temporal continuity pattern and/or measure other patterns such as the amplitude of the anomaly soundwave.

By measuring the amplitude of the anomaly soundwave, the method 300 may determine the intensity of the hazard. For example, in a case of a fire detection, the intensity of a fire is detected. The method 300 may transmit the intensity information to be displayed on a screen or to other detection or monitoring components that are in communication with the detection systems 100 or 200.

By determining a temporal continuity pattern of the anomaly soundwave, the method 300 may determine that a hazard actually exists. For example, if the method 300 determines temporal continuity by continuing to detect the anomaly soundwave that corresponds to a hazard over one or more pre-determined or dynamically varying time frames (e.g. a continuity threshold), it may determine that a hazard actually exists and will create an alarm accordingly. If the method 300 determines a pattern of the anomaly soundwave that stops after one or more pre-determined or dynamically varying time frames, the method 300 will not create the alarm. Doing so will reduce the likelihood of a false alarm.

The methods described herein may use the controller component 103 to analyzes the data (e.g., plot/graph/stored data points) using an artificial intelligence (AI)-based technique or machine learning model/algorithm. For example, the controller component 103 may analyze the data using a machine learning model that is configured to determine an extracted anomaly soundwave corresponds to a hazard situation by identifying patterns, trends, and/or features in an output plot of a graph or stored datapoints depicting the hazard situation. The controller component 103 may cause display of an indication of the determined the hazard situation, such as via display circuitry.

Figure 4:
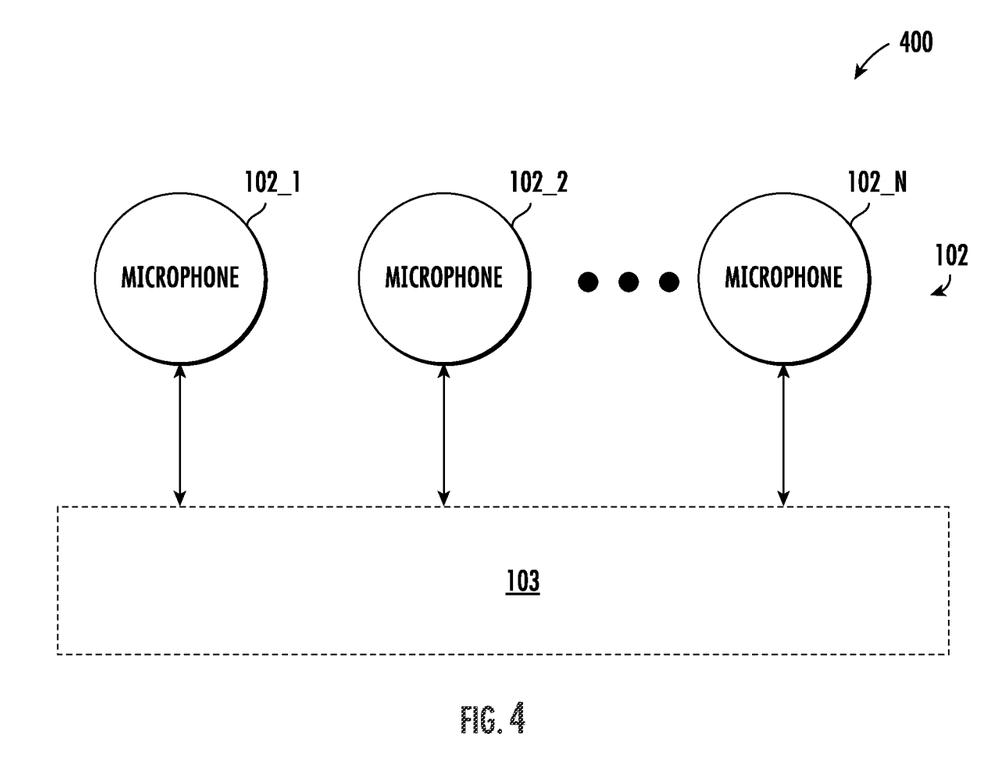
FIG. 4 illustrates an example schematic diagram depicting a hazard detecting system in accordance with various embodiments of the present disclosure.

Referring to FIG. 4, a schematic diagram depicting a hazard detecting system 400 in accordance with various embodiments of the present disclosure is provided. In the detecting system 400, the microphone array 102 (referring to FIG. 1 or 2) may include microphones 102_1, 102_2, . . . , 102_N. In an exemplary embodiment, N may be any integer greater or equal to two.

The array of microphones 102_1, 102_2, . . . , 102_N may detect a soundwave from the environment that may include the background noise and an anomaly sound. When an anomaly sound is detected, using the outputs of the array of microphones 102_1, 102_2, . . . , 102_N, any of a direction, distance, and rate of change in the direction and/or distance (e.g. speed) of a source of the anomaly soundwave is detected. The direction and or distance from the source may be detected using any of a triangulation method and phase difference in the anomaly soundwave as detected by the array of microphones 102_1, 102_2, . . . , 102_N. The rate of change in the direction and/or distance (e.g. speed) of a source of the anomaly soundwave may be detected using a doppler shift in the soundwave as detected by the array of microphones 102_1, 102_2, . . . , 102_N.

In various embodiments herein, the system 400 may generate an output having the information on any of a direction, distance, and rate of change in the direction and/or distance (e.g. speed) of a source of the anomaly soundwave. Using such information, other monitoring systems may focus monitoring on the location of the source of the source of a hazard that may be the cause of the anomaly soundwave.

Figure 5:
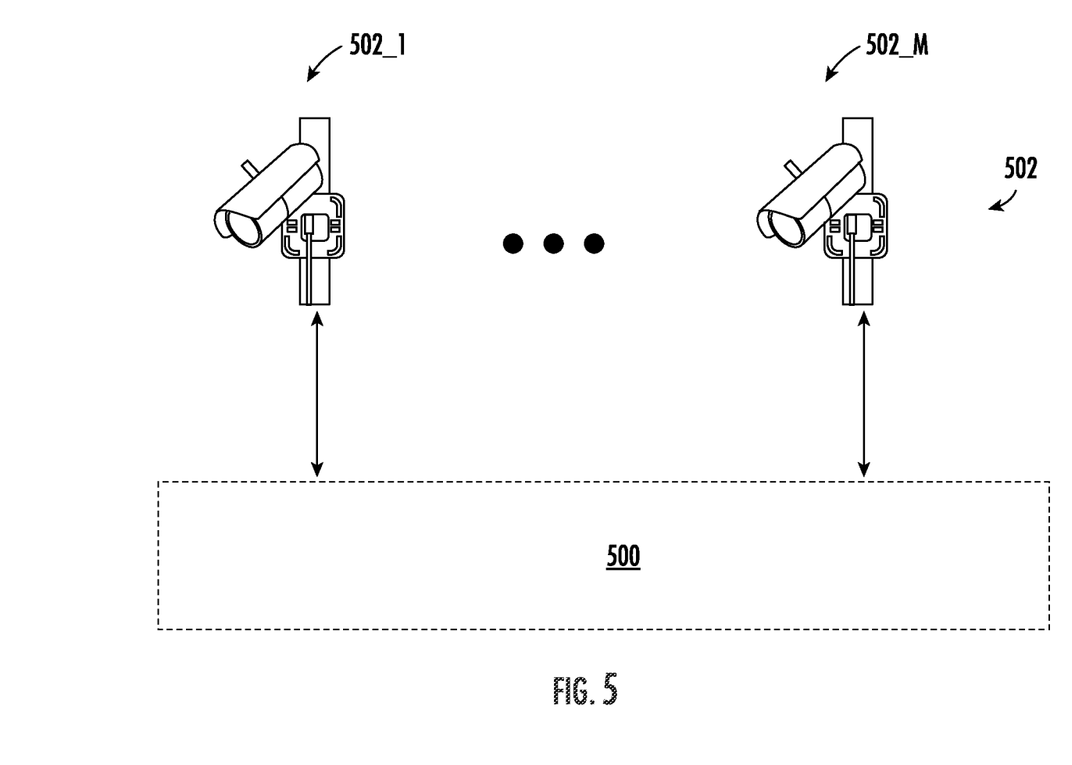
FIG. 5 illustrates an example schematic diagram depicting a hazard detecting system in accordance with various embodiments of the present disclosure.

Referring to FIG. 5, a schematic diagram depicting a hazard detecting system 500 in communication with one or more CCTV cameras 502 in accordance with various embodiments of the present disclosure is provided. In some embodiments herein, the hazard detecting system 500 may be any of the detecting systems 100, 200, or 400, with reference to FIG. 1, 2, or 4.

The one or more CCTV cameras 502 may include any of the CCTV cameras 502_1, . . . , 502_M, where M is an integer greater or equal to one. Any of the CCTV cameras 502 may include a rotation device and have the capability of zooming or focusing on and monitoring various areas of an environment where the detection system 500 is located.

According to various embodiments herein, the detecting system 500 may determine and transmit an area of interest using any of a location, direction, and/or speed of travel of a detected hazard source to any of the CCTV cameras 502. The CCTV cameras may zoom or focus on the location of the hazard source (the area of interest) so the hazard can be further investigated or monitored. In an embodiment, the detecting system 500 may continue to determine and/or update the area of interest by updating the detection of any of the location, direction, and/or speed of travel of a detected hazard source and transmit the updated information to the CCTV cameras.

According to various embodiments herein, the CCTV cameras 502 may also include microphones. The detecting system may use the soundwaves detected by the microphone(s) of the CCTV cameras 502 in addition or instead of the microphone array 102 for detecting soundwaves. According to an embodiment herein, the any other imaging-based detection and/or monitoring device for hazard detection and/or monitoring may be used instead of the CCTV cameras 502. The imaging-based detection and/or monitoring device may use image processing to detect and/or monitor hazards. Various image processing technique such as pattern recognition, shape recognition, light intensity recognition, etc. may be used. According to various embodiments herein, any other monitoring and/or detecting devices for example Infra-Red (IR) cameras, high temperature cameras, surveillance cameras, or any imaging system and/or cameras capable of monitoring or detecting fire or the like may be used instead of and/or in combination with the CCTV cameras 502.

Figure 6:
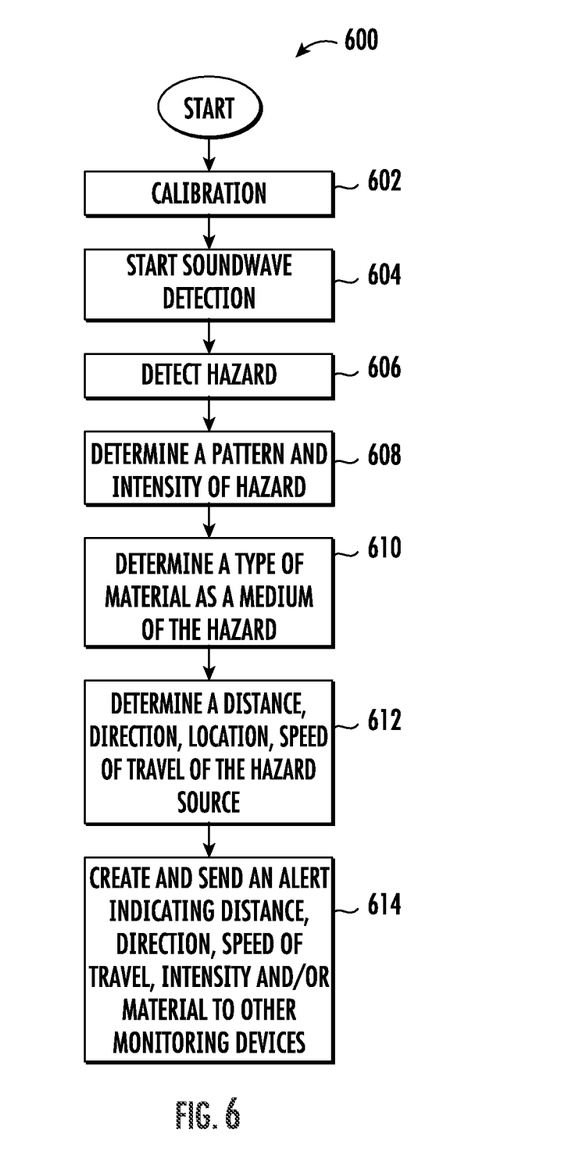
FIG. 6 is a flowchart diagram illustrating example operations in accordance with various embodiments of the present disclosure.

Referring now to FIG. 6, a flowchart diagram illustrating example operations of a method 600 in accordance with various embodiments of the present disclosure is provided.

At step 602 the method 600 may provide a calibration of a hazard detection system. The hazard detection system may be any of the detection systems 100, 200, 400, or 500, referring to FIG. 1, 2, 4, or 5, according to various embodiments herein.

The calibration may include building a library of signatures of background soundwaves and/or building a library of signatures of hazard soundwaves.

The library of signatures of background soundwaves may be a collection of one or more pre-determined sound signature(s) corresponding to the background noise. In an embodiment, the pre-determined sound signature(s) corresponding to the background noise in the library of signatures of background soundwaves may be created by detecting a background noise calibrating soundwave. In an example, the background noise calibrating soundwave may be detected by operating the detecting system for a period of time in a controlled environment where the background soundwaves are present, but no hazard event occurs. The detecting system may record the detected background noise as the background noise calibrating soundwave. The detecting system may create a pre-determined sound signature corresponding to the background noise using the detected and/or the recorded background noise calibrating soundwave. For example, the method 600 may determine a signature associated with the soundwave using properties of the soundwave such as variations or variation patterns in amplitude, phase, etc. In an example, the method 600 may repeat this step to create another pre-determined sound signature corresponding to the background noise for a different background noise calibrating soundwave, for example when a condition in the environment changes. The library of background soundwave signatures may be created using a collection of the pre-determined sound signature(s) corresponding to the background noise.

The library of signatures of hazard soundwaves may be a collection of one or more pre-determine sound signature(s) corresponding to a hazard soundwave. In an embodiment, the pre-determined sound signature(s) corresponding to the hazard soundwave in the library of signatures of hazard soundwaves may be created by detecting a hazard calibrating soundwave. In an example, the hazard calibrating soundwave may be detected by operating the detecting system for a period of time in a controlled environment where background noise is absent, but a particular hazard event creating the corresponding hazard soundwave is present. The detecting system may record the detected hazard soundwave as the hazard calibrating soundwave. The detecting system may create a pre-determined sound signature corresponding to the hazard soundwave using the detected and/or the recorded hazard calibrating soundwave. For example, the method 600 may determine a signature associated with the hazard soundwave using properties of the soundwave such as variations or variation patterns in amplitude, phase, etc. In an example, the method 600 may repeat this step to create another pre-determined sound signature corresponding to a hazard soundwave for a different hazard or potential hazard, for example any of a fire, flame, spark, combustion, or ignition and/or the like. The library of hazard soundwave signatures may be created using a collection of the pre-determined sound signature(s) corresponding to the hazard or potential hazard. This step may be repeated for various hazard events.

In an embodiment, the method 600 begins detecting soundwaves in an environment at step 604. The soundwaves may be detected using any of the microphone array 102, referring to FIGS. 1, 2, 4, or other microphones or sound detecting devices such as those that may be present on the CCTV cameras 502, referring to FIG. 5.

In an embodiment, the method 600 may detect a hazard at step 606, if/when one is present or occurs in the environment. The method 600 may use the various steps and algorithms for detecting and extracting an anomaly soundwave and determining a type of the anomaly soundwave using noise reduction algorithms and/or machine learning models/algorithms as described with reference to FIGS. 1-5.

In an embodiment, the method 600 may detect a presence of the anomaly sound by determining matching level(s) of a detected soundwave or a signature of the detected soundwave with a library of the signatures of the background sounds specific to the environment where the soundwave is detected.

According to an example, the matching level(s) may be determined using a vector matching algorithm. For example, the library of the signatures of the background sounds may be recorded using a matrix data structure. The matrix data structure may include vectors each corresponding to a signature of a background noise/sound caused by various conditions in the environment. In an example of a forest environment, the background noise matrix may include vectors corresponding to rainy, windy and/or calm weathers, etc. Values corresponding to the detected soundwave or a signature of the detected soundwave may be recorded in a vector data structure representing the detected soundwave signature. In an example, the matching level(s) would be a distance of the detected soundwave vector from any, all, or some of the vectors in the background noise matrix. For example, a Euclidean, Hamming, Minkowski or other types of distance between the detected soundwave vector and any, all, or some of the vectors in the background noise matrix is determined. In an example, if more than one distance is determined, any combination such as an average or a weighted average of the distances may be used to determine one matching level. In an example, multiple matching levels may be determined each corresponding to a distance of the detected soundwave vector to some or all of the vectors in the background noise matrix. In an example, the matching level(s) have an inverse relationship with the determined distance(s), so that a larger distance indicates a lesser matching level and a closer distance indicates a higher matching level. For example, any inverse function may be used to determine the matching level(s) based on the determined distance(s).

If the matching level(s) is/are below a given threshold(s), the method 600 determines that the detected soundwave is deviated from the background soundwaves normal to the environment, therefore an anomaly soundwave is present.

In an embodiment herein, method 600 determines a type of hazard at step 606. For example, the method 600 determines the type of the hazard by determining the closest hazard soundwave signature in in the library of hazard soundwave signatures that matches the extracted anomaly sound or a signature of the extracted anomaly soundwave. The method 600 may determine the closest matching hazard soundwave signature in in the library of hazard soundwave signatures by determining matching level(s) of the extracted anomaly soundwave or a signature of the extracted anomaly soundwave with any or all of the signatures in the library of signatures of hazard soundwaves. For example, the method 600 may use the vector matching algorithm to determine the matching level(s). In an example, the library of hazard soundwave signatures may be recorded using a matrix data structure. The matrix data structure may include vectors each corresponding to a signature of a hazard soundwave caused by various hazards or potential hazards. Values corresponding to the extracted anomaly soundwave or a signature of the extracted anomaly soundwave may be recorded in a vector data structure representing the extracted anomaly soundwave signature. In an example, the matching(s) level would be a distance of the extracted anomaly soundwave vector from any, all, or some of the vectors in the library of hazard soundwave signatures matrix. For example, a Euclidean, Hamming, Minkowski or other type of distance between the extracted anomaly soundwave vector and any, all, or some of the vectors in the library of the hazard soundwaves signature matrix is determined. In an example, if more than one distance is determined, any combination such as an average or a weighted average of the distances may be used to determine one matching level. In an example, multiple matching levels may be determined each corresponding to a distance of the detected soundwave vector to some or all of the vectors in the hazard soundwaves signature matrix. In an example, the matching level has an inverse relationship with the determined distance(s), so that a larger distance indicates a lesser matching level and a closest distance indicates a higher matching level. For example, any inverse function may be used to determine the matching level based on the determined distance(s). In an example, when multiple matching levels are determine, the type of hazard in the library that has the highest matching level to the extracted anomaly soundwave vector (or the lowest distance) is determined to be the type of the detected hazard.

In an example, if the extracted anomaly soundwave matches the soundwave of a spark most closely, the method 600 detects spark as the type of hazard in step 606. If, for example, the extracted anomaly soundwave matches the soundwave of a fire most closely, the method 600 detects fire as the type of hazard in step 606.

In an embodiment, at step 608, the method 600 determines a pattern associated with the hazard. In an embodiment, the pattern may indicate a repetition or a continuity of the hazard soundwave. The repetition or continuity may be used to reduce false alarms. If the method 600 determines that the soundwave determined to match a hazard does not continue, an alert based on the detection is not created.

In an embodiment, method 600 may detect the intensity of the hazard at step 608. For example, the detected pattern may include detection of the amplitude or volume of the hazard soundwave which may indicate the intensity of the hazard.

At step 610, the method 600 may determine a type of the material as the medium of the hazard. The method 600 may determine the material medium using the extracted hazard soundwave or the detected pattern or intensity or volume of the hazard soundwave. In an example, the method 600 may determine whether the material medium is solid, liquid or gas. For example the method 600 may determine whether a solid material is on fire or liquid or gas is on fire. In an example, the method 600 may determine whether the material medium is a gas leak in a pipe, such as a fire or an ignition caused by the gas leak. In an example, the method 600 may determine whether the material medium is a liquid container, such as a fire or combustion of a liquid container. In an example, the method 600 may determine whether the material medium is wood, such as a burning wood.

At step 612, the method 600 may determine a distance, direction or speed of travel of the hazard source. In an embodiment, the method 600 may use any of the triangulation, phase detection, and doppler shift measurement using output generated by the array of microphones 102 or CCTV cameras 502, referring to FIGS. 1-2, 4-5, to determine distance, direction or speed of travel of the hazard source.

Using the distance and direction of the hazard source, the method 600 may determine the location of the hazard source in a reference coordinate.

At step 614, the method 600 may create an alert indicating a detected hazard. The alert may include information related to the type of the hazard, intensity of the hazard, distance, direction, speed of travel of the hazard source, and/or material medium of the hazard. In an embodiment, if at step 608 the method 600 determines a false alarm trigger based on the determined pattern (for example, by determining that the anomaly soundwave is discontinued), an alert is not created.

The method 600 may send the alert to other monitoring devices such as imaging-based hazard detection device, for example CCTV cameras, Infra-Red (IR) cameras, high temperature cameras, surveillance cameras, or any imaging system and/or cameras capable of monitoring or detecting fire or the like. Based on the alert, the other monitoring devices may take further actions such as focusing on the source of the hazard, tracking the source of the hazard, or verifying various data included in the alert related to the source of hazard.

Figure 7:
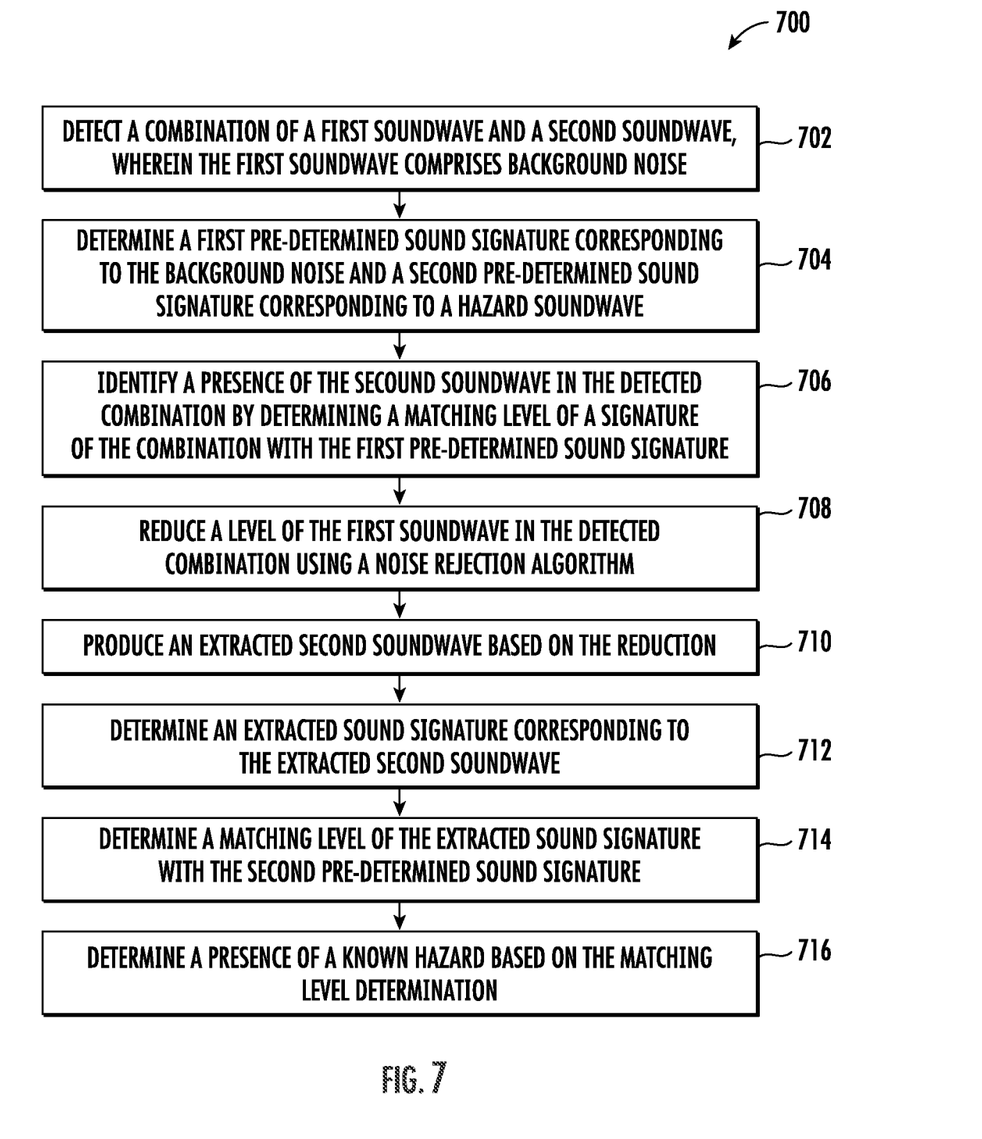
FIG. 7 is a flowchart diagram illustrating example operations in accordance with various embodiments of the present disclosure.

Referring now to FIG. 7, a flowchart diagram illustrating example operations of a method 700 in accordance with various embodiments of the present disclosure is provided.

At step 702, method 700 detects a combination of a first soundwave and a second soundwave in an exemplary embodiment herein. The soundwaves may be detected using the microphone array 102 as is shown and described with respect to FIGS. 1, 2, 4, and/or other sound detecting devices according to various embodiments herein. The first soundwave may include background noise received from an environment where the detecting device is located, and the second soundwave may be the anomaly soundwave, for example as described with respect to FIGS. 1-6. At step 704, the method 700 may determine a first pre-determined sound signature corresponding to the background noise (a signature of background noise in the library of the signatures of the background sounds) and a second pre-determined sound signature corresponding to a hazard soundwave (a hazard soundwave signature in the library of hazard soundwave signatures). For example, the method 700 may use the calibration step 602 as described with respect to FIG. 6 to determine the first and second pre-determined sound signatures corresponding to the background and hazard soundwaves respectively.

According to an embodiment, at step 706, the method 700 identifies a presence of the second soundwave in the detected combination by determining a matching level of a signature of the combination with the first pre-determined sound signature (e.g. signature of a background noise/sound). In an example, a matching level determination as described with reference to the method 600 in FIG. 6 for identifying the presence of the second soundwave (such as the anomaly soundwave) is used.

According to an example herein, the method 700 reduces a level of the first soundwave in the detected combination using a noise reduction algorithm. For example, the method 700 uses a noise reduction algorithm to reduce the values corresponding to the background noise from the combination of the anomaly soundwave (which may be an indicator of a hazard) and the background noise as was detected in the combination. By doing so, at step 710, the method 700 may produce an extracted second soundwave (indicating of the anomaly soundwave which may be caused by a hazard or hazard source) based on the noise reduction, according to an example.

According to an embodiment, the method 712 determines an extracted sound signature corresponding to the extracted second soundwave at step 712. In an example, the method 700 may determine the extracted sound signature by creating a vector, matrix, table, chart, graph, hologram, and/or set including information or data with respect to a time or frequency distribution of various aspects such as amplitude, phase, energy, power, intensity of the extracted second soundwave. In an example, the extracted sound signature may include information or data indicating various identifying properties of the signals produced by a microphone, or any other sound detection devices, when detecting the second soundwave, such as time or frequency distribution of the signals generated as a result of the detection.

In an embodiment, the method 700 may determine a matching level of the extracted sound signature with the second pre-determined sound signature (e.g. hazard soundwave signature) at step 714 as for example described with respect to step 606 of method 600 in FIG. 6.

In an embodiment, at step 716, the method 700 determines a presence of a known hazard based on the matching level determination. For example when the matching level of the extracted sound signature with the second pre-determined sound signature (which corresponds to a hazard soundwave) is above a threshold, the method 700 may determine that the second soundwave is due to a presence of a hazard, hence it determines that a hazard is present.

In some examples, methods 300, 600, and/or 700 may be performed by the controller component 103.

In some examples, one or more of the procedures described in FIG. 3, FIG. 6, and/or FIG. 7 may be embodied by computer program instructions, which may be stored by a memory (such as a non-transitory memory) of a system employing an embodiment of the present disclosure and executed by controller component 103 of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A detecting apparatus comprising:
a first microphone configured to detect a combination of a first soundwave and a second soundwave, wherein the first soundwave comprises background noise;
a memory configured to store a first pre-determined sound signature corresponding to the background noise and a second pre-determined sound signature corresponding to a hazard soundwave;
a controller component configured to:
identify a presence of the second soundwave in the detected combination by matching a signature of the combination with the first pre-determined sound signature;
reduce a level of the first soundwave in the detected combination using noise reduction;
produce an extracted second soundwave based on the noise reduction;
determine an extracted sound signature corresponding to the extracted second soundwave;
determine a matching level of the extracted sound signature with the second pre-determined sound signature;
determine a presence of a known hazard based on the matching level determination;
determine a pattern of the extracted second soundwave, wherein the pattern indicates at least one of temporal continuity and amplitude of the extracted second soundwave; and
determine a material medium of the known hazard based on the pattern of the extracted second soundwave.

2. The detecting apparatus of claim 1, wherein the memory is configured to store a plurality of second pre-determined sound signatures each corresponding to one of a plurality of known hazard soundwaves caused by any of a fire, flame, spark, combustion, or ignition and wherein the controller component is further configured to:
determine a plurality of matching levels of the extracted sound signature with the plurality of second pre-determined sound signatures; and
determine a type of the known hazard using a highest matching level of the plurality of matching levels.

3. The detecting apparatus of claim 1, wherein the controller component is further configured to generate an alarm indicating the presence of the known hazard when the determined temporal continuity is greater than a continuity threshold.

4. The detecting apparatus of claim 1, wherein the controller component is further configured to:
determine an intensity of the known hazard using the amplitude of the extracted second soundwave.

5. The detecting apparatus of claim 1, wherein the controller component is further configured to:
calibrate the detecting apparatus by collecting a background noise calibrating soundwave in a controlled environment where the detecting apparatus is located and when the known hazard is absent; and
determining the first sound signature using the background noise calibrating soundwave;
wherein the background noise calibrating soundwave is received from any of:
the first microphone;
an environment monitoring sensor; or
a remote environment monitoring server.

6. The detecting apparatus of claim 1, further comprising a second microphone configured to detect the combination of the first and second soundwaves.

7. The detecting apparatus of claim 6, wherein the controller component is further configured to determine a direction or distance of a source of the second soundwave with respect to the detecting apparatus using a first output from the first microphone and a second output from the second microphone, wherein the first and second outputs comprise phase or frequency of the second soundwave as detected by each of the first and second microphones.

8. The detecting apparatus of claim 7, wherein the controller component is further configured to determine a speed of the source of the second sound wave with respect to the detecting apparatus using the first and second outputs.

9. The detecting apparatus of claim 8, further comprising:
an imaging-based detection device configured to detect the known hazard based on image processing;
a focusing component configured to direct, orient, or concentrate the imaging-based detection device to an area of interest;
wherein the controller component is further configured to:
determine the area of interest using the determined direction or distance of the source of the second soundwave; and
update the area of interest using the travel speed of the source of the second soundwave.

10. The detecting apparatus of claim 7, wherein the microphone is located on a Closed-Circuit Television (CCTV) camera, wherein the CCTV camera includes a focusing component configured to direct, orient, or concentrate the CCTV camera to an area of interest, wherein the controller component is further configured to determine the area of interest based on the determined direction or distance of the source of the second sound wave.

11. The detecting apparatus of claim 1, wherein the microphone is located on a Closed-Circuit Television (CCTV) camera.

12. The detecting apparatus of claim 1, wherein the material medium of the known hazard is one of solid, liquid, or gas.

13. A method comprising:
detecting a combination of a first soundwave and a second soundwave, wherein the first soundwave comprises background noise;
determining a first pre-determined sound signature corresponding to the background noise and a second pre-determined sound signature corresponding to a hazard soundwave;
identifying a presence of the second soundwave in the detected combination by determining a matching level of a signature of the combination with the first pre-determined sound signature;
reducing a level of the first soundwave in the detected combination using noise reduction;
producing an extracted second soundwave based on the noise reduction;
determining an extracted sound signature corresponding to the extracted second soundwave;
determining a matching level of the extracted sound signature with the second pre-determined sound signature;
determining a presence of a known hazard based on the matching level determination;
determining a pattern of the extracted second soundwave, wherein the pattern may indicate any of the temporal continuity and amplitude of the extracted second soundwave; and
determining a material medium of the known hazard using the pattern of the extracted second soundwave.

14. The method of claim 13, further comprising:
determining a plurality of second pre-determined sound signatures each corresponding to one of a plurality of known hazard soundwaves caused by any of a fire, flame, spark, combustion, or ignition; and
determining a plurality of matching levels of the extracted sound signature with the plurality of second pre-determined sound signatures; and
determining a type of the known hazard using a highest matching level of the plurality of matching levels.

15. The method of claim 13, further comprising generating an alarm indicating the presence of the known hazard when the determined temporal continuity is greater than a continuity threshold.

16. The method of claim 15, further comprising determining a direction and a distance of a source of the second soundwave with respect to the detecting apparatus.

17. The method of claim 16, further comprising determining a speed of the source of the second sound wave with respect to the detecting apparatus.

18. The method of claim 17, further comprising:
determining a location of the source of the second soundwave using the direction and the distance of the source of the second soundwave with respect to the detecting apparatus;
communicating the location of the second soundwave to an imaging-based detection apparatus;
imaging the source of the second soundwave using the imaging-based detection apparatus; and
updating the location of the source of the second soundwave using the speed of the source of the second sound wave.

19. The method of claim 17, further comprising:
determining a location of the source of the second soundwave using the direction and the distance of the source of the second soundwave with respect to the detecting apparatus;
communicating the location of the second soundwave to a Closed-Circuit Television (CCTV) camera; and
directing the CCTV camera to take an image or record a video of the source of the second soundwave.

20. The method of claim 13, wherein the material medium of the known hazard is one of solid, liquid, or gas.

\* \* \* \* \*